US008842524B2

(12) United States Patent
Dake (10) Patent No.: US 8,842,524 B2
(45) Date of Patent: Sep. 23, 2014

(54) REDUNDANT RING AUTOMATIC RECOVERY (75) Inventor: Steven Charles Dake, Scottsdale, AZ (US)

(73) Assignee: Red Hat, Inc., Raleigh, NC (US)

(*) Notice: Subject to any disclaimer, the term of this patent is extended or adjusted under 35 U.S.C. 154(b) by 191 days.

(21) Appl. No.: 13/408,239

(22) Filed: Feb. 29, 2012

(65) Prior Publication Data

US 2013/0223206 A1    Aug. 29, 2013

(51) Int. Cl.
*H04L 12/437*    (2006.01)
(52) U.S. Cl.
CPC .................... *H04L 12/437* (2013.01)
USPC ............................... 370/227; 398/4
(58) Field of Classification Search
CPC ...................................... H04L 12/437
USPC ............ 370/216–228; 398/1–9, 39, 115, 118, 398/140
See application file for complete search history.

(56) References Cited

U.S. PATENT DOCUMENTS

| | | | | |
|---|---|---|---|---|
| 6,553,508 | B1* | 4/2003 | Minyard | 714/4.5 |
| 7,783,788 | B1* | 8/2010 | Quinn et al. | 710/8 |
| 2008/0317061 | A1* | 12/2008 | Dake | 370/452 |
| 2009/0222815 | A1* | 9/2009 | Dake | 718/1 |

OTHER PUBLICATIONS

Koch et al., "The Totem Redundant Ring Protocol", IEEE Proceedings of the 22 nd International Conference on Distributed Computing Systems (ICDCS'02), 2002.*

* cited by examiner

*Primary Examiner* — Andrew Chriss
*Assistant Examiner* — Peter Mak
(74) *Attorney, Agent, or Firm* — Lowenstein Sandler LLP (57) ABSTRACT

Methods and systems for automatically recovering from a failure event in one or more nodes of a redundant ring network are provided. An indication is received at a first ring of nodes that an associated second ring of nodes has failed. A probing token is circulated around the second ring of nodes while a probing timer is started. The injecting a probing token and starting a probing timer are repeated if the probing timer expires before the probing token circulates completely around the second ring of nodes. A recovery token is circulated around the second ring of nodes to enable each node of the second ring of nodes and to disable the probing timer if the probing token circulates completely around the second ring of nodes.

22 Claims, 6 Drawing Sheets

REDUNDANT RING AUTOMATIC RECOVERY

TECHNICAL FIELD

Embodiments of the present invention relate to computing systems, and more specifically, to a method and apparatus for automatically recovering from a failure event in one or more nodes of a redundant ring network.

BACKGROUND

A number of systems have been developed for providing network communications among groups of users. These systems may employ a network configuration, such as a Totem ring network configuration, in order to provide a fault tolerant structure for the network communications. Totem ring networks are relatively well known and provide for multicast delivery of messages, where messages may be transmitted and delivered to multiple locations, and ensure that the sequence in which messages are received is maintained throughout the system.

The Totem ring protocol operates by organizing the nodes of a system into one or more virtual rings of processors around which a token rotates. When a token is received by a processor, that processor may multicast any messages in its pending transmit queue. The token contains a sequence number and retransmit list.

A sequence number is employed to provide a total order of messages such that each node can order messages in the same order. On each multicast, the token's sequence number is increased. When the token is forwarded to the next node in the ring, the token sequence number is transmitted based upon what was received plus the number of multi-casted messages.

The retransmit list is used to request retransmission of missing messages. On receipt of a token, a processor of a node compares the token's sequence number with its currently received messages. If any message is missing from its list, it augments the retransmit list with the missing messages. Also, upon receipt of the token, any messages in the retransmit list for which the processor has a copy are multicast by that processor.

In order to support multiple rings, the totem protocol creates gateways between the totem single rings. In general, each of the rings operates on separate multicast target addresses. Each gateway only forwards messages which are required by the other ring. In this way, the totem multi-ring protocol is more scalable. For example, it is possible for each sub-ring among a plurality of sub-rings to obtain the maximum throughput available and reduce latency by ½ the token rotation time in a single ring structure.

In order to determine whether to forward a particular message, the gateway nodes check a character string in each message called a "group" that identifies which messages should be sent to which nodes. Each gateway maintains a list of groups that are relevant to the rings it interfaces.

One type of Totem ring architecture that is particularly fault tolerant is a redundant Totem ring. The nodes of a first ring are replicated in a second ring. Messages and actions are replicated across both rings using multicasting of messages such that, in the case of a failure in the first ring, a protection mechanism permits switching over to the second ring without loss of data.

One problem with existing redundant Totem rings is that a failure of a single node in one ring, say, in a network interface card (NIC), causes the whole ring to fail. In order for that ring to be "healthy," all the NICs on that ring have to be working and active. An administrator may type in a command to reset the rings and attempt to re-enable the failed ring based on a timer. Because the Totem ring employs the multicast protocol, one or more messages sent to nodes on the ring to be re-activated while the timer is active may be blocked, and the timer expires. Attempts have been made to overcome this problem by resetting the timer, for example, every ten seconds, and then re-enabling the ring. Unfortunately, the multicast protocol would still block the transmission of messages for five to ten seconds before the failed ring is re-enabled.

BRIEF DESCRIPTION OF THE DRAWINGS

The present invention is illustrated by way of example, and not by way of limitation, and will become apparent upon consideration of the following detailed description, taken in conjunction with the accompanying drawings, in which like reference characters refer to like parts throughout, and in which.

DETAILED DESCRIPTION

Methods and systems for automatically recovering from a failure event in one or more nodes of a redundant ring network are described herein. In one embodiment, a first ring of nodes receives an indication that an associated second ring of nodes has failed. A first timer is started and a probing token is initiated. When the first time expires, a second probing timer is started and the probing token is circulated around the second ring of nodes. If the probing timer expires before the probing token circulates completely around the second ring of nodes, then the first timer is re-started and the probing token is re-transmitted around the second ring of nodes. Re-starting the second timer and re-transmitting the probing token around the second node of rings may be repeated at periodic intervals. If the probing token circulates completely around the second ring of nodes, then a recovery token is circulated around the second ring of nodes to enable each node of the second ring of nodes and to disable the probing token. The probing token is discarded and the second ring of nodes is declared in working order. In an embodiment, the recovery token may be employed to provide total ordering and recovery of lost messages. In an embodiment, the second ring may be any failed ring(s) that compose the redundant ring network.

A faulty redundant (second) ring no longer requires administrative intervention to repair. Nor does an administrator need to be involved with the process of re-enabling the redundant ring. A redundant ring is automatically recovered by checking the health of the ring periodically. By validating that the redundant ring is active before re-enabling the redundant ring, the redundant ring doesn't exhibit a blocking behavior.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Figure 1:
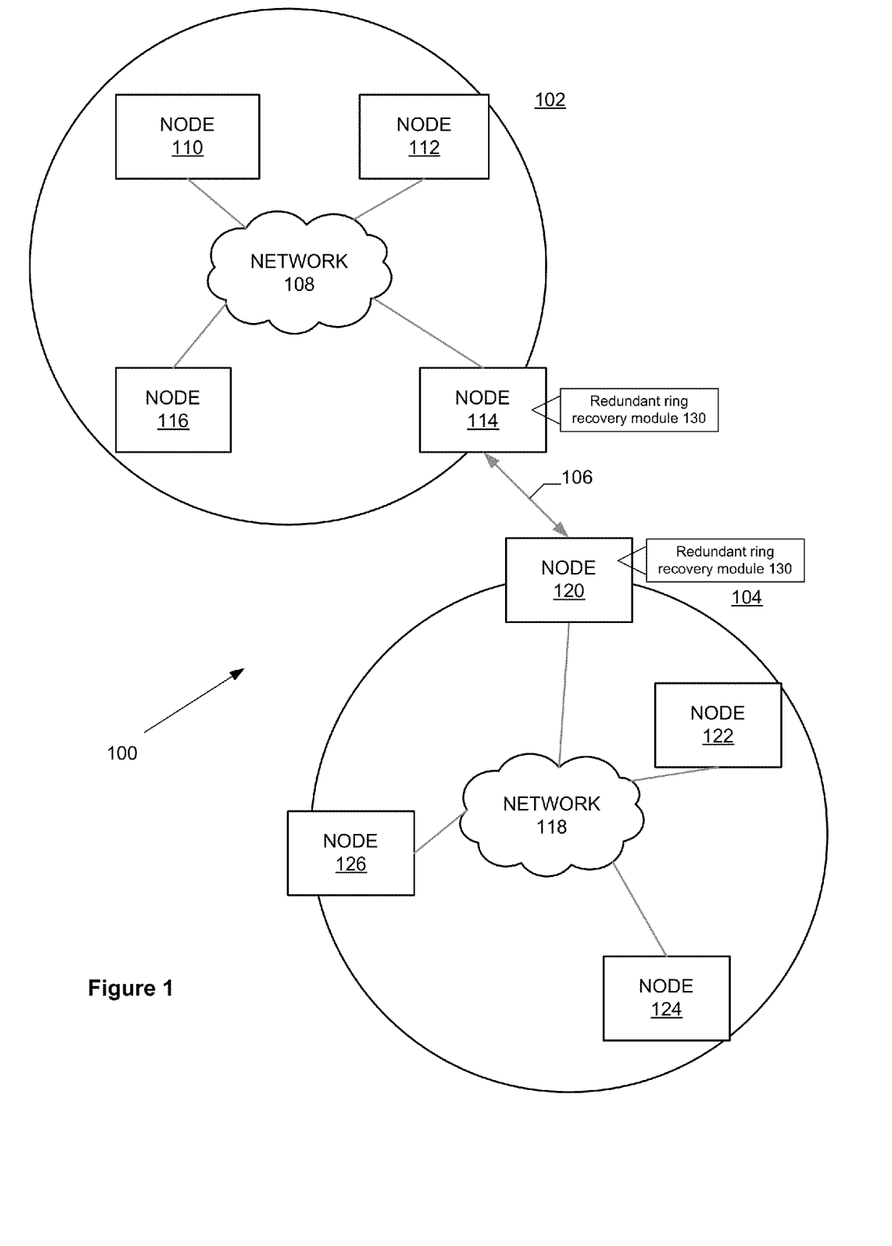
FIG. 1 illustrates an exemplary redundant ring network system architecture in which embodiments of the present invention may operate.

FIG. 1 illustrates an exemplary redundant Totem ring network system 100 in which embodiments of the present invention may operate. Network system 100 is a virtual synchrony system including a first Totem ring 102 and a second Totem ring 104. Rings 102 and 104 are interconnected together via at least two links 106 per node (only one pair of links 106 is illustrated). Each of the Links 106 may be a link across a local area network or a wide area network (WAN).

The redundant Totem ring 102 includes a local area network (LAN) 106 interconnecting Totem nodes 110, 112, 114, and 116. Similarly, the Totem ring 104 includes a LAN 118 interconnecting Totem nodes 120, 122, 124, and 126. Although FIG. 1 illustrates two Totem rings 102, 104, system 100 may comprise any number of sub-rings. Likewise, each sub-ring may comprise any number of nodes. In an embodiment, ring 104 may have the same, few, or a greater number of nodes as the ring 102.

Nodes 110, 112, 114, 116, 120, 122, 124, and 126 refer to any device that is capable of being connected as part of the network system 100. For example, each of the nodes 110-126 may represent a general purpose computer, a server, a router, or one or more virtual machines running on any of the previous devices, etc. In general, the nodes 110, 112, 114, 116, 120, 122, 124, and 126 are running various processes or applications, for example, for providing server functions, distributed applications, web applications, database operations, and the like.

Each of nodes 110, 112, 114, 116, 120, 122, 124, and 126 is coupled to networks 108 and 118 respectively. These links are well known to those skilled in the art. For example, nodes 110, 112, 114, 116, 120, 122, 124, and 126 may utilize well known protocols, such as Ethernet, transmission control protocol/internet protocol (TCP/IP), or a standard network interface, Asynchronous Transport Mode (ATM), or the like, to connect to the networks 108 and 118. Each of the nodes 110-126 may be provided with a redundant ring recovery module 130 for initiating and executing a multi-token based recovery protocol for automatically recovering from a node failure in one of the rings 102, 104. For example, when a node (e.g., node 122 of ring 104) fails, the redundant ring recovery module 130 in node 114 of ring 102 is configured to periodically activate a probing timer and transmit a probing token over the link 106 to the redundant ring recovery module 130 of node 120. The probing token is circulated around the ring 104 via each node's redundant ring recovery module 130. If the probing token makes its way completely around the ring 104 before the probing timer expires, then it is known that the second ring 104 has recovered. A recovery token is then circulated around the ring 104 to disable the probing timer and reactivate each of the nodes 120-126.

Figure 2:
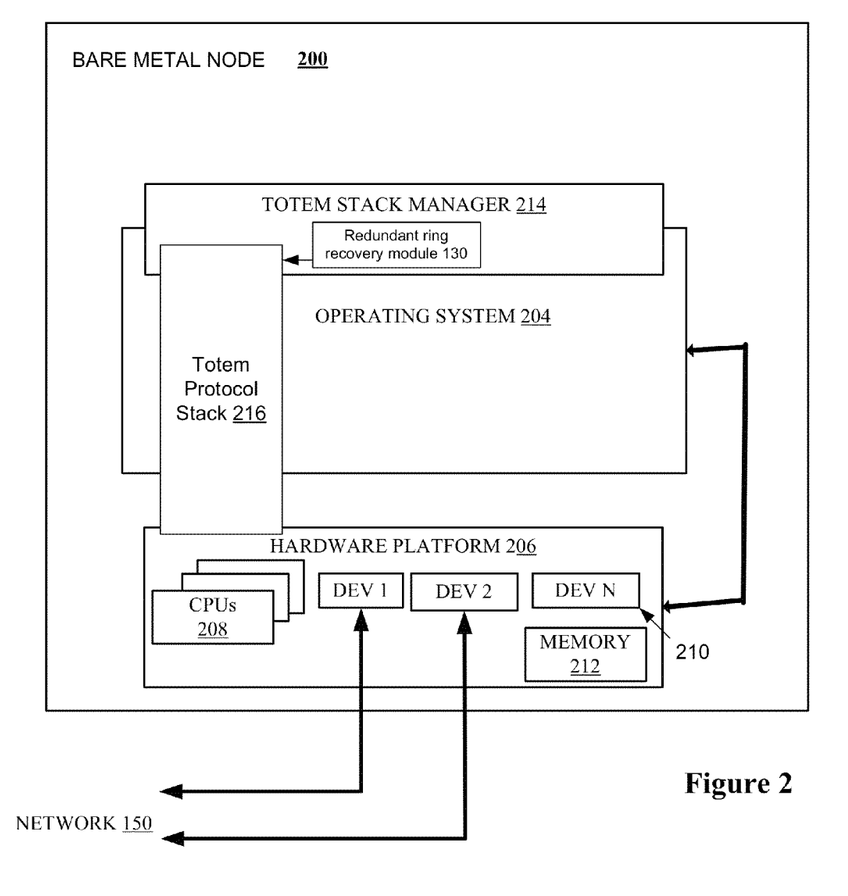
FIG. 2 is a block diagram illustrating one embodiment of a node, in which embodiments of the present invention may be implemented.

FIG. 2 is a block diagram illustrating one embodiment of a node 200, in which embodiments of the present invention may be implemented. FIG. 2 shows node 110 as representative of all the nodes. In general, nodes 110, 112, 114, 116, 120, 122, 124, and 126 are likely to be substantially similar in their structure. However, one skilled in the art will recognize that various nodes may differ in varying degrees depending on their specific function, location, etc.

The node 200 may be a computer system such as, for example, a server computer, a gateway computer, or any other suitable computer system that is configurable for operating as a node. The node 200 comprises an operating system 204 and a hardware platform 206. The operating system 204 may include Microsoft Windows®, Linux®, Solaris®, Mac® OS or any other suitable operating system for managing operations on the node 200.

The hardware platform 206 may include one or more central processing units (CPUs) 208, devices 210, and memory 212. The devices 210 may be comprised of one or more hardware and software devices (DEV 1-DEV N), which may be located internally and externally to the node 200. An example of the devices 210 may include a pair of network interface cards (NICs) such as Ethernet network cards (e.g., device "DEV 1" and "DEV 2")) for executing a Totem Ring protocol via communication over a network 150. The network 150 may be a private network (e.g., a local area network (LAN) or a wide area network (WAN), intranet, etc.).

Other examples of the devices 210 may include sound or video adaptors, photo/video cameras, printer devices, keyboards, displays, a USB host controller, or any other suitable device intended to be coupled to a computer system. Examples of the memory 212 include random-access memory (RAM), non-volatile storage memory (e.g., Flash, EEPROM, solid state drives (SSD), etc.), magnetic storage memory (e.g., one or more hard drives), and optical memory (e.g., CDs, DVD, BlueRay drives, etc.).

In an embodiment, a Totem protocol stack manager 214 may straddle user space and run partially on and within the operating system 204 to control the operation of a Totem protocol stack 216 which may straddle user space, the operating system 204, and the hardware platform. The Totem protocol stack manager 214 may execute a request to read or write data to/from a network interface controller (NIC) or one or both of the network cards such as the Ethernet network cards (e.g., device "DEV 1" and "DEV 2") for communication over the network 150. The network 150 may be a private network (e.g., a local area network (LAN), wide area network (WAN), intranet, etc.) or a public network (e.g., the Internet). The Totem protocol stack manager 214 make include a redundant ring recovery module 130 for initiating and executing a multi-token based recovery protocol for automatically recovering from a node failure in a second ring. The redundant ring recovery module 130 is configured to communicate with modules of the Totem protocol stack 216 for creating, operating, and transmitting the probing timer, the probing token, and the recovery token over the network 150 to the redundant ring recovery modules 130 of other nodes in the second ring.

The node 200 may further comprise a ring configuration in its memory 212. The ring configuration records information about the current ring configuration of node 200. This information may include parameters, such as the multicast addresses and processor identifiers of the other nodes. In addition, ring configuration may include group membership information of the other nodes.

Figure 3:
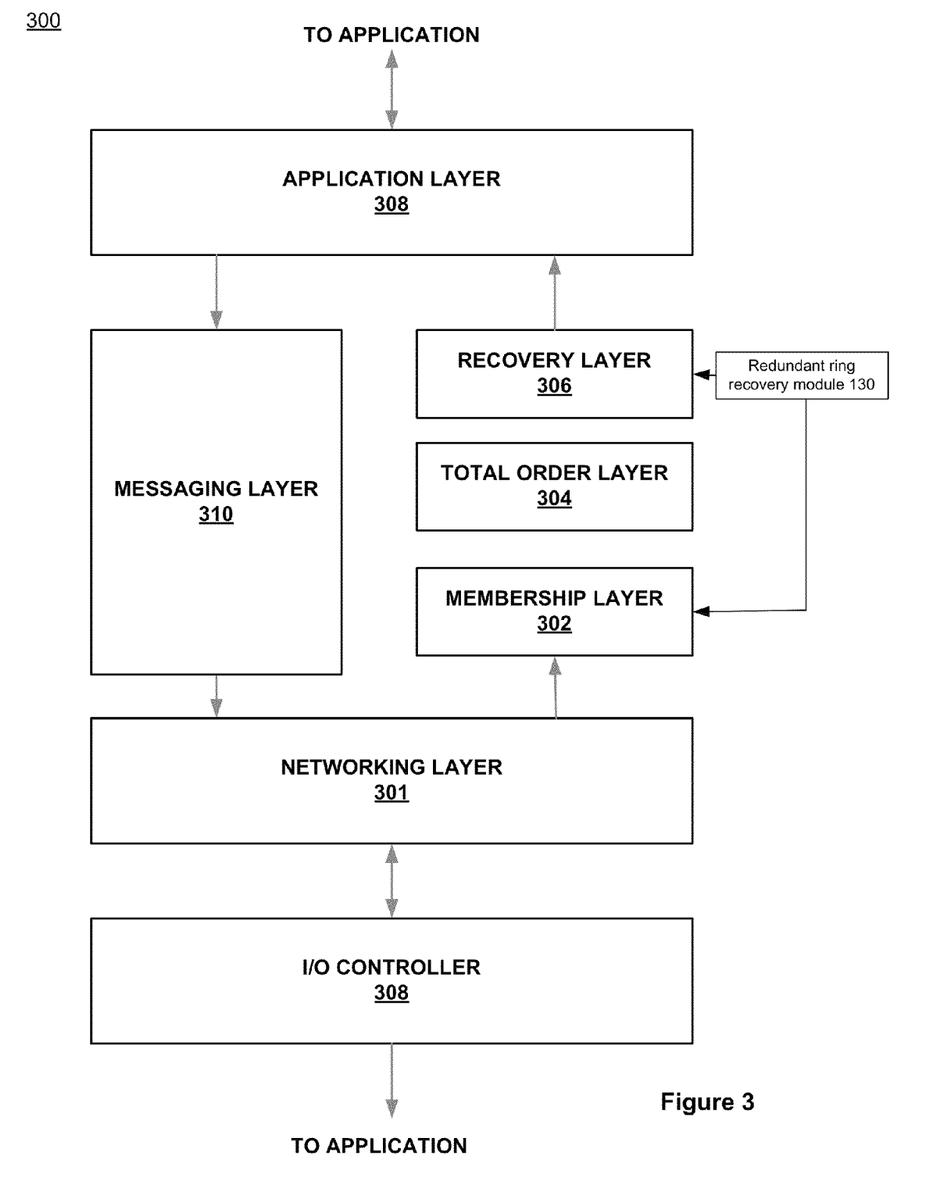
FIG. 3 illustrates a Totem protocol stack for the nodes in the system of FIG. 1.

FIG. 3 illustrates a Totem protocol stack 300 for the nodes 200 in the system 100. From a software perspective, each of nodes 110, 112, 114, 116, 120, 122, 124, and 126 may be comprise a number of protocol layers, which are substantially similar. Node 110 may be comprised of the node 200 as a representative of one or more of the nodes shown in FIG. 1.

As shown in FIG. 3, the Totem protocol stack 300 of node 110 comprises a network layer 301, a membership layer 302, a total order layer 304, a recovery layer 306, an application layer 308, and a messaging layer 310.

Network layer 301 is responsible for interfacing with network interface device DEV1 of FIG. 2 and processing the receiving and transmitting of messages or packets of messages, in total order to and from the network layer 301. The network layer 301 may also be responsible for assembling segments of a message as they are received via network interface devices DEV1 and DEV2.

Membership layer 302 ensures consensus on membership configuration among configuration members and termination, such that every member node installs the same configuration with an agreed membership within a bounded time, unless it fails. Membership layer 302 may also comprise instructions for recovering one or more tokens (e.g., the probing token and the recovery token of the multi-token based recovery protocol for automatically recovering from a node failure in a second ring of a redundant ring network) and generates one or more tokens and recover messages that had not been received by some members when failure occurs.

Total order layer 304 implements instructions related to reliable delivery, total ordering of messages and flow control of the messages. For example, total order layer 304 may review the timestamp on each collected message, and orders the messages in a sequential order relative to other messages based on the timestamp. In general, total order layer 304 is configured to comply with the known Totem ring protocols.

Recovery layer 306 implements recovery in the event of a member node failure, link failure, or token loss failure of one or both of the rings 102, 104 to be described below.

Application layer 308 provides an interface with the application (not shown) for which messages are being received or sent. For example, application layer 308 may manage and coordinate the relationship and interaction of application processes running on other nodes. In accordance with the Totem ring protocol, application processes may run on a plurality of nodes and are herein referred to as a "group". Accordingly, a message sent to a group is sent to all nodes having processes that are part of the group. Application layer 308 also facilitates the communication of information and received messages between one process and other processes and groups in system 100. The messaging layer 310 generally comprises an application program configured for processing a message received from the process group management layer 306. Upon receipt of such a message, the messaging layer 310 processes the message and generates a response to a message sender layer 314.

Messaging layer 310 is configured to receive the response of an application and is configured to divide the response into packets that are suitable for transmission across network 108. Messaging layer 310 will then transfer these packets to interface devices DEV1 and DEV2 for transmission to network 108.

In an embodiment, the Totem protocol stack manager 330 of FIG. 2 (not shown) may be configured with a redundant ring recovery module 130 (not shown). The redundant ring recovery module 130 of one node of a first ring may be configured to communicate with the membership layer 302 to create the probing token, the recovery token, and timers that are coordinated and transmitted by the recovery layer 306 via the network layer 301 to corresponding layers in Totem protocol stacks 300 in other nodes of a second ring of a redundant ring network. Each of the corresponding Totem protocol stack managers 330 manages the corresponding layers 301, 302, and 306 of other nodes for initiating and executing the multi-token based recovery protocol for automatically recovering from a node failure in the second ring of the redundant ring network.

Figure 4:
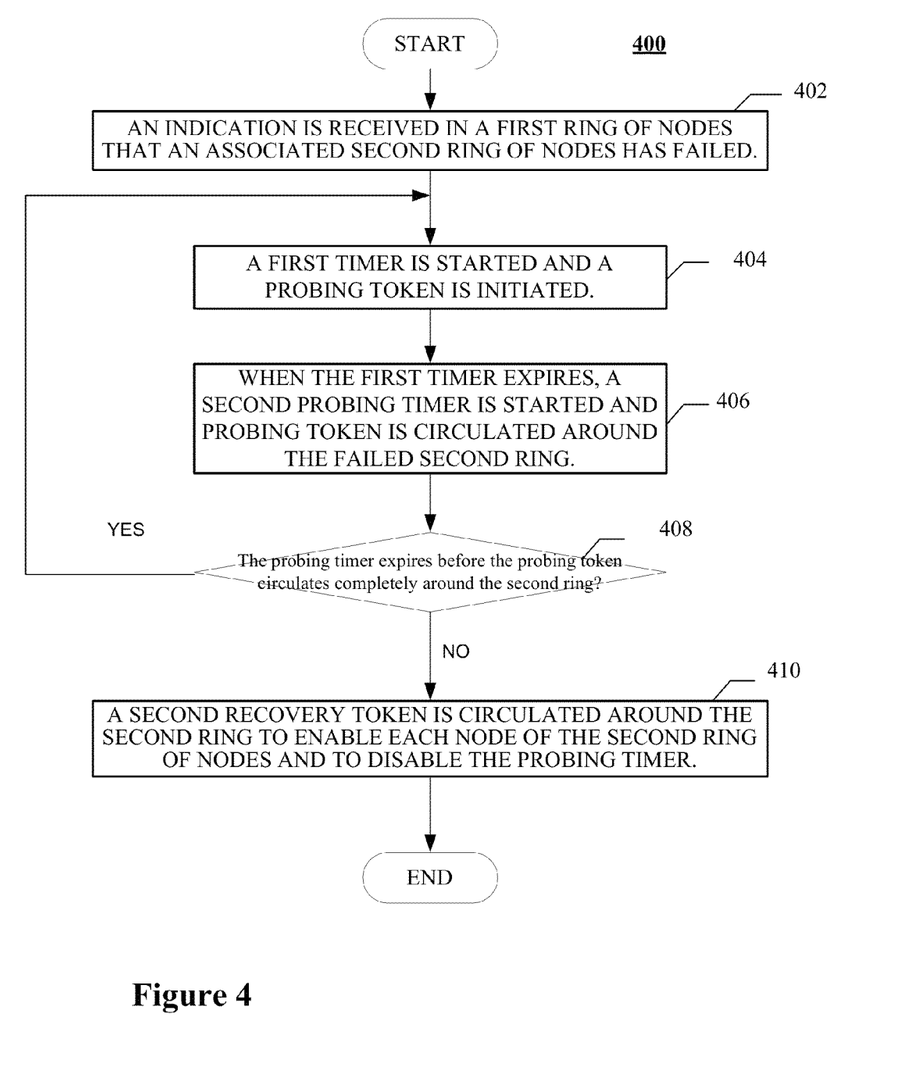
FIG. 4 is a flow diagram illustrating one embodiment of a method for automatically recovering from a failure event in one or more nodes of a redundant ring network.

FIG. 4 is a flow diagram illustrating one embodiment of a method 400 for automatically recovering from a failure event in one or more nodes of a redundant ring network. Method 400 may be performed by processing logic (e.g., in computer system 600 of FIG. 6) that may comprise hardware (e.g., circuitry, dedicated logic, programmable logic, microcode, etc.), software (such as instructions run on a processing device), firmware, or a combination thereof.

At block 402, a first ring of nodes receives an indication that an associated second ring of nodes has failed. In an embodiment, the second ring may be any failed ring(s) that composes the redundant ring network. In an embodiment, in FIGS. 1 and 3, the recovery layer 306 in the node 114 spanning the link 106 between the first ring of nodes 102 and the second ring of nodes 102, receives an indication that a second ring of nodes 104 has failed. In an embodiment, one or more of the nodes 120, 122, 124, or 126 may have failed.

At block 404, a first timer is started and a probing token is initiated. The first timer is a recurring timer that sends a probing token on its timeout only on failed rings. The probing token is employed for determining the health of nodes through which the probing token circulates. In an embodiment, the redundant ring recovery module 130 instructs the recovery layer 306 to start the first timer and send a message to the membership layer 302 to prepare to initiate a probing token. The first timer is configurable by a system administrator.

At block 406, when the first time expires and a failed second ring of nodes is detected, a probing timer is started and the probing token is circulated around the second ring of nodes (i.e., from ring member 0). In an embodiment, the recovery layer 306 starts the probing timer and sends a message to the membership layer 302 to begin circulating the probing token around the failed ring 104. The redundant ring recovery module 130 instructs the membership layer 302 of the node 114 to transmit the probing token over the link 106 to the membership layer 302 of a corresponding redundant node 120 in the failed second ring 104.

Figure 5A:
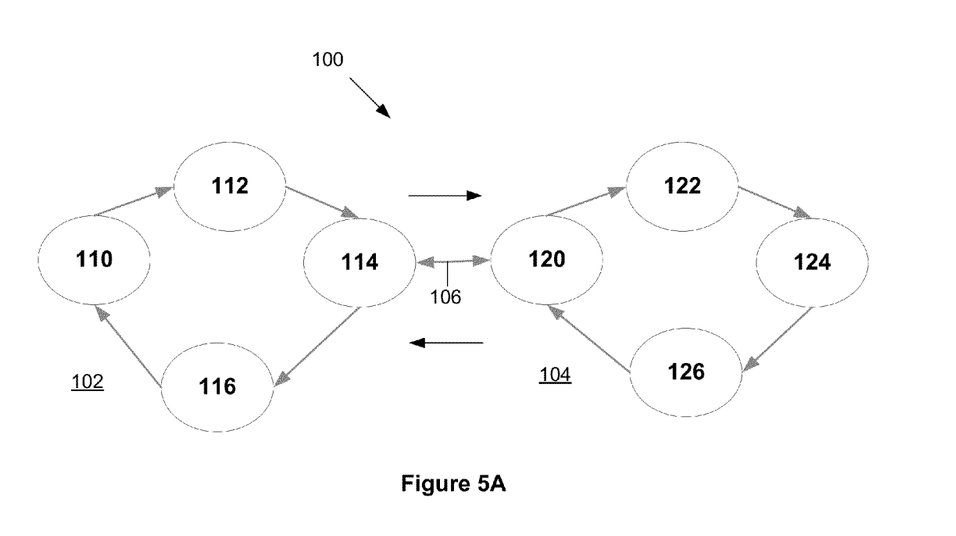
FIG. 5A is a block diagram illustrating rotation of a probing token around a failed ring in the same direction as an ordering of nodes in an active ring according to an embodiment.
Figure 5B:
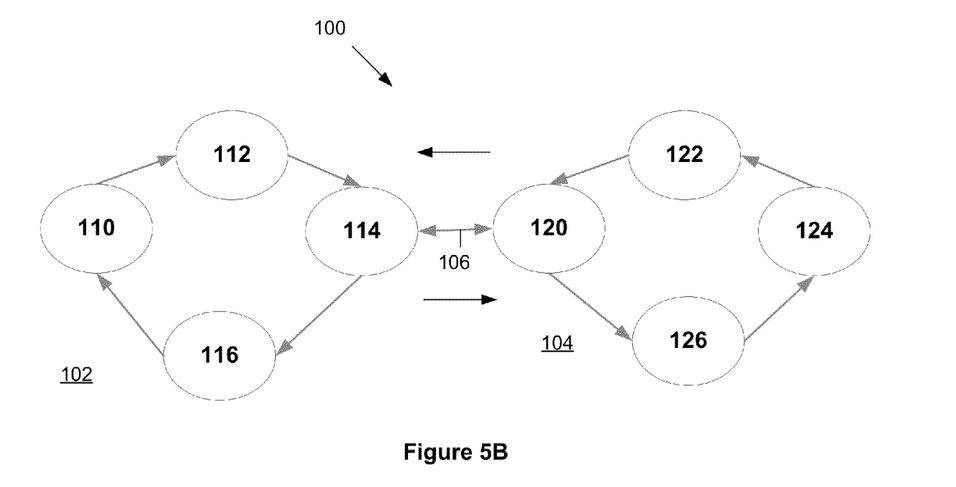
FIG. 5B is a block diagram illustrating rotation of a probing token around a failed ring in the opposite direction as an ordering of nodes in an active ring according to an embodiment.

The probing token circulates around the second ring 104 in either a clockwise or a counter clockwise order of the nodes of the second ring 104. In an embodiment, as shown in FIG. 5A, the probing token is shown circulating in the same direction around the second ring 104 as the ordering of the nodes in the first ring 102. In FIG. 5B, the probing token is shown circulating in the opposite direction around the second ring 104 as the ordering of the nodes in the first ring 102 (via corresponding membership layers 302 of the nodes 122, 124, and 126).

If, at block 408, the probing timer expires before the probing token circulates completely around the second ring of nodes, then the second ring of nodes is considered to still be in a failed condition. As a result, in an embodiment, at periodic intervals, the redundant ring recovery module 130 instructs the membership layer 302 of node 114 of the first ring 102 to re-start the probing timer and re-transmit a probing token around the second node of rings 104 such that blocks 404-410 are repeated until all nodes of the second ring 104 have been repaired (e.g., by human operators).

If, at block 408, the probing token circulates completely around the second ring of nodes 102 before the probing timer expires, then the second ring of nodes is considered to have recovered. As a result, at block 410, a recovery token is circulated around the second ring of nodes to enable each node of the second ring of nodes and to disable the probing token. More particularly, if the probing token returns back to the membership layer 302 of node 114 of the first ring 102 before the probing timer expires, then the redundant ring recovery module 130 instructs the recovery layer 306 to send a message to the membership layer 302 to begin circulating a recovery token around the second ring of nodes 104 to enable each node of the second ring of nodes 104 and to disable the probing timer. In other words, the recovery token checks the health of the ring 104. Once the recovery token returns back to the node 114 of the first ring (e.g., node 114) over the link 106, it is discarded and the second ring is declared in working order.

In an embodiment, if the recovery token does not make it around back to the bridge node of the first ring (e.g., node 114) in a certain amount of time (i.e., the second timer expires), the membership protocol may be executed to determine new membership of the ring 104 and thus form a new non-redundant sub-network (which may now have fewer nodes). This may be provided by executing the well known Totem single ring membership protocol.

Figure 6:
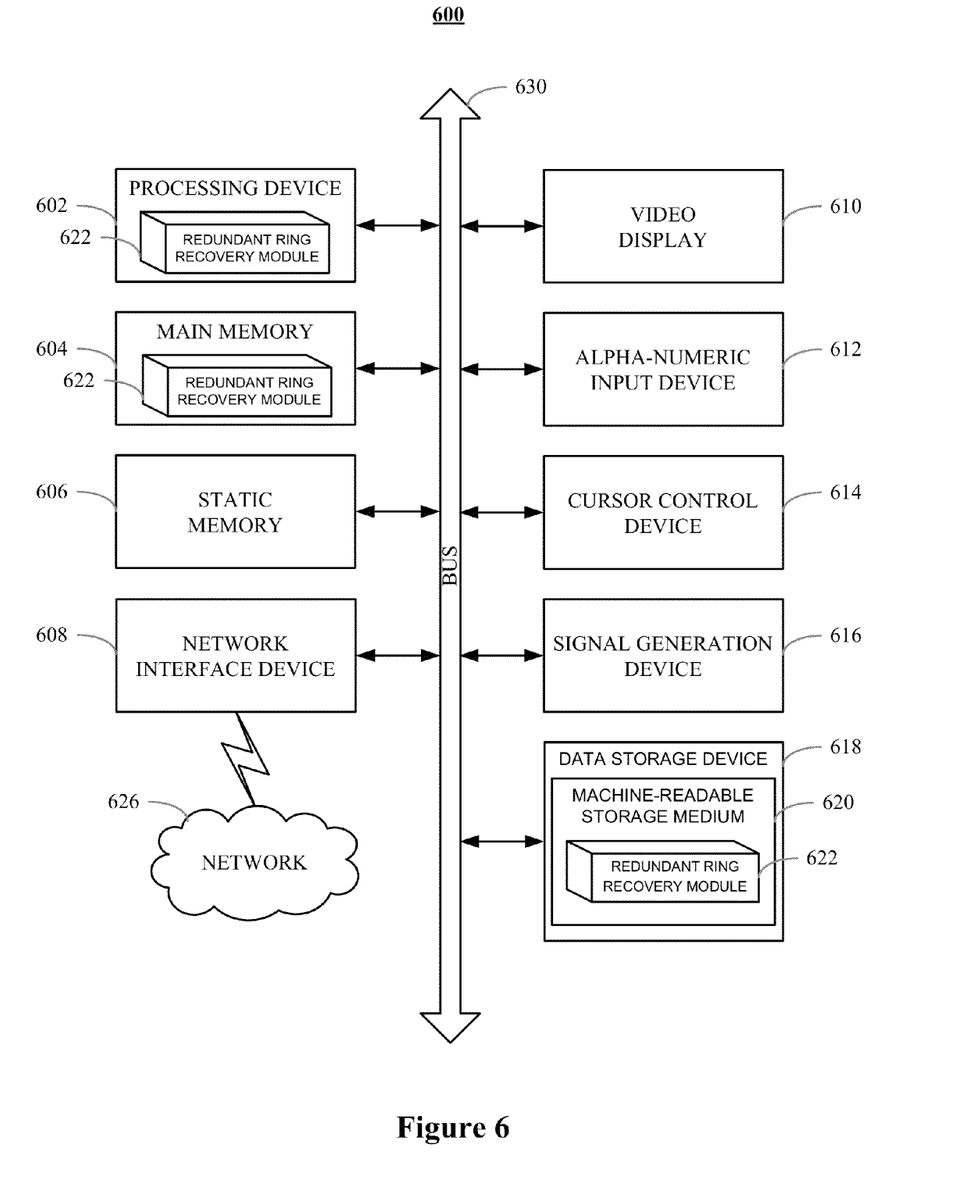
FIG. 6 illustrates a diagrammatic representation of a machine in the exemplary form of a computer system within which a set of instructions, for causing the machine to perform any one or more of the methodologies discussed herein, may be executed.

FIG. 6 illustrates a diagrammatic representation of a machine in the exemplary form of a computer system 600 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a personal digital assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 600 includes a processing device 602, a main memory 604 (e.g., read-only memory (ROM), flash memory, dynamic random access memory (DRAM) (such as synchronous DRAM (SDRAM) or Rambus DRAM (RDRAM), etc.), a static memory 606 (e.g., flash memory, static random access memory (SRAM), etc.), and a data storage device 618, which communicate with each other via a bus 630.

Processing device 602 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. Processing device 602 is configured to execute redundant ring recovery module 622 for performing the operations and steps discussed herein.

Computer system 600 may further include a network interface device 608. Computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

Data storage device 618 may include a machine-readable storage medium (or more specifically a computer-readable storage medium) 620 having one or more sets of instructions (e.g., redundant ring recovery module 622) embodying any one or more of the methodologies of functions described herein. Redundant ring recovery module 622 may also reside, completely or at least partially, within main memory 604 and/or within processing device 602 during execution thereof by computer system 600; main memory 604 and processing device 602 also constituting machine-readable storage media. Redundant ring recovery module 622 may further be transmitted or received over a network 626 via network interface device 608.

Machine-readable storage medium 620 may also be used to store the device queue manager logic persistently. While machine-readable storage medium 620 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instruction for execution by the machine and that causes the machine to perform any one or more of the methodologies of the present invention. The term "machine-readable storage medium" shall accordingly be taken to include, but not be limited to, solid-state memories, and optical and magnetic media.

The components and other features described herein can be implemented as discrete hardware components or integrated in the functionality of hardware components such as ASICs, FPGAs, DSPs or similar devices. In addition, these components can be implemented as firmware or functional circuitry within hardware devices. Further, these components can be implemented in any combination of hardware devices and software components.

Some portions of the detailed descriptions are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the above discussion, it is appreciated that throughout the description, discussions utilizing terms such as "enabling", "transmitting", "requesting", "identifying", "querying", "retrieving", "forwarding", "determining", "passing", "processing", "disabling", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory devices including universal serial bus (USB) storage devices (e.g., USB key devices) or any type of media suitable for storing electronic instructions, each of which may be coupled to a computer system bus.

The algorithms and displays presented herein are not inherently related to any particular computer or other apparatus. Various general purpose systems may be used with programs in accordance with the teachings herein or it may prove convenient to construct more specialized apparatus to perform the required method steps. The required structure for a variety of these systems will be apparent from the description above. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method, comprising:
   receiving, at a first ring of nodes, an indication that an associated second ring of nodes has failed;
   circulating a probing token around the second ring of nodes while starting a probing timer;
   repeating said circulating the probing token and re-starting the probing timer in response to the probing timer expiring before the probing token circulates completely around the second ring of nodes; and
   circulating, by a processing device, a recovery token around the second ring of nodes to enable each node of the second ring of nodes and to disable the probing timer in response to the probing token circulating completely around the second ring of nodes.

2. The method of claim 1, further comprising starting a first timer when the second ring of nodes is determined to have failed.

3. The method of claim 2, wherein the first timer is configurable.

4. The method of claim 2, further comprising, when the first time expires, beginning said circulating the probing token and starting the probing timer.

5. The method of claim 2, wherein starting said first timer is repeated periodically.

6. The method of claim 1, further comprising designating the second ring of nodes as an active ring of nodes in response to the recovery token circulating completely around the second ring of nodes.

7. A computer system, comprising:
   a memory;
   a processing device coupled to the memory to:
      receive, at a first ring of nodes, an indication that an associated second ring of nodes has failed;
      circulate a probing token around the second ring of nodes while starting a probing timer;
      repeat said injecting a probing token and starting a probing timer in response to the probing timer expiring before the probing token circulates completely around the second ring of nodes; and
      circulate a recovery token around the second ring of nodes to enable each node of the second ring of nodes and to disable the probing timer in response to the probing token circulating completely around the second ring of nodes.

8. The system of claim 7, further comprising starting a first timer when the second ring of nodes is determined to have failed.

9. The system of claim 8, wherein the first timer is configurable.

10. The system of claim 8, further comprising, when the first time expires, beginning said circulating the probing token and starting the probing timer.

11. The system of claim 8, wherein starting said first timer is repeated periodically.

12. The system of claim 7, further comprising designating the second ring of nodes as an active ring of nodes in response to the recovery token circulating completely around the second ring of nodes.

13. The system of claim 7, wherein the first ring of nodes and the second ring of nodes belong to a Totem redundant ring system.

14. The system of claim 7, wherein the first ring of nodes and the second ring of nodes have identical configurations of nodes.

15. The system of claim 7, wherein at least one node of the first ring of nodes or the second ring of nodes resides on a bare metal host machine.

16. The system of claim 7, wherein at least one node of the first ring of nodes or the second ring of nodes resides on a virtual machine.

17. A non-transitory computer readable storage medium including instructions that, when executed by a processing device, cause the processing device to perform operations comprising:
   receiving, at a first ring of nodes, an indication that an associated second ring of nodes has failed;
   circulating a probing token around the second ring of nodes while starting a probing timer;
   repeating said injecting a probing token and starting a probing timer in response to the probing timer expiring before the probing token circulates completely around the second ring of nodes; and
   circulating, by the processing device, a recovery token around the second ring of nodes to enable each node of the second ring of nodes and to disable the probing timer in response to the probing token circulating completely around the second ring of nodes.

18. The non-transitory computer readable storage medium of claim 17, further comprising starting a first timer when the second ring of nodes is determined to have failed.

19. The non-transitory computer readable storage medium of claim 18, wherein the first timer is configurable.

20. The non-transitory computer readable storage medium of claim 18, wherein the operations further comprise, when the first time expires, beginning said circulating the probing token and starting the probing timer.

21. The non-transitory computer readable storage medium of claim 18, wherein starting said first timer is repeated periodically.

22. The non-transitory computer readable storage medium of claim 17, wherein the operations further comprise designating the second ring of nodes as an active ring of nodes in response to the recovery token circulating completely around the second ring of nodes.

* * * * *